United States Patent [19]

Ohashi et al.

[11] Patent Number: 4,820,473
[45] Date of Patent: Apr. 11, 1989

[54] METHOD OF REDUCING RADIOACTIVITY IN NUCLEAR PLANT

[75] Inventors: Kenya Ohashi, Hitachi; Takashi Honda; Yasumasa Furutani, both of Katsuta; Eizi Kashimura, Naka; Akira Minato; Katsumi Ohsumi, both of Hitachi, all of Japan

[73] Assignee: Hitachi, Ltd., Tokyo, Japan

[21] Appl. No.: 795,466

[22] Filed: Nov. 6, 1985

[30] Foreign Application Priority Data

Nov. 6, 1984 [JP] Japan ............................ 59-233507

[51] Int. Cl.$^4$ .............................................. G21C 19/30
[52] U.S. Cl. .................................... 376/305; 148/287; 376/900
[58] Field of Search ............... 376/305, 306, 414, 416, 376/417, 900; 148/6.14 R, 6.35

[56] References Cited

U.S. PATENT DOCUMENTS

| | | | |
|---|---|---|---|
| 774,069 | 11/1904 | Goodsell | 148/6.14 R |
| 2,543,710 | 2/1951 | Schmidt et al. | 148/6.35 |
| 3,294,644 | 12/1966 | Walton | 376/306 |
| 3,479,232 | 11/1969 | Broussard . | |
| 3,556,870 | 1/1971 | Debray et al. | 376/305 |
| 3,663,725 | 5/1972 | Pearl | 376/306 |
| 4,042,455 | 8/1977 | Brown | 376/306 |
| 4,483,720 | 11/1984 | Bartlett et al. | 148/6.35 |
| 4,526,626 | 7/1985 | Carter | 376/305 |
| 4,722,823 | 2/1988 | Honda et al. | 376/306 |

FOREIGN PATENT DOCUMENTS

| | | | |
|---|---|---|---|
| 1541221 | 10/1968 | France . | |
| 2299418 | 8/1976 | France . | |
| 121197 | 9/1980 | Japan . | |
| 37498 | 2/1984 | Japan . | |
| 216095 | 12/1984 | Japan . | |
| 98390 | 6/1985 | Japan | 376/306 |
| 169091 | 10/1988 | Japan . | |
| 277126 | 4/1977 | U.S.S.R. | 376/306 |
| 1471853 | 4/1977 | United Kingdom . | |

OTHER PUBLICATIONS

Kitamura et al., Nuclear Science and Engineering; 89, 61–69 (1985).

*Primary Examiner*—Charles T. Jordan
*Assistant Examiner*—Richard W. Wendtland
*Attorney, Agent, or Firm*—Antonelli, Terry & Wands

[57] ABSTRACT

The present invention is concerned with a method of reducing radioactivity in a nuclear plant by preliminarily forming oxide films on the surfaces of metallic structural members to be in contact with high-temperature and high-pressure reactor water containing radioactive substances before said metallic members are exposed to said reactor water. The method is characterized by the steps of subjecting said structural members to a first-step oxidation treatment of heating said structural members in an environment of a high temperature, and further subjecting the thus treated structural members to a second step oxidation treatment of heating said treated structural members in an environment having a higher oxidizing capacity than that of said environment in said first-step oxidation treatment to form a denser oxide film than an oxide film obtained in said first step oxidation treatment. According to the present invention, radioactivity in the nuclear plant can be reduced remarkably.

25 Claims, 2 Drawing Sheets

METHOD OF REDUCING RADIOACTIVITY IN NUCLEAR PLANT

BACKGROUND OF THE INVENTION

The present invention relates to a novel method of reducing radioactivity, particularly to a method of suppressing adherence of radioactive substances to structural materials used in contact with a liquid containing the radioactive substances dissolved therein, for example, primary cooling water piping in a nuclear power plant, and to a method of suppressing release of metallic ions or metallic oxides released from the structural materials and activated in a reactor core.

Piping, pumps, valves etc. used in a primary cooling water system of a nuclear power station are made of stainless steel, Stellite which is a Co based alloy, etc. (hereinafter briefly referred to as "structural members"). These metals are subject to corrosion or damages in the course of long-term services thereof. As a result, constituent metallic elements are dissolved in reactor cooling water (hereinafter briefly referred to as "cooling water") to be entrained into the reactor. Most of the dissolved metallic elements are converted into oxides thereof, which then adhere to fuel rods. In this state, the metallic elements are irradiated with neutrons. As a result, radioactive nuclides such as $^{60}Co$, $^{58}Co$, $^{51}Cr$, and $^{54}Mn$ are formed. These radioactive nuclides are dissolved into primary cooling water again to suspend in the form of ions or insoluble solid components (hereinafter referred to as "crud"). Part of them is removed in a demineralizer, etc. for purification of reactor water, but the rest adheres to the surfaces of structural members in the course of circulation through the primary cooling water system. Therefore, the dose rate on the surfaces of the structural members increases, thus presenting a problem of radiation exposure of workers during the course of maintenance and inspection.

Accordingly, there have been proposed methods of suppressing causative dissolution of the above-mentioned metallic elements for decreasing the amount of the adhering radioactive substances. These methods include, for example, a method of suppressing corrosion of the structural members by using a corrosion-resistant material, and a method of suppressing corrosion of the structural members by introducing oxygen into a water supply system. However, in either method, corrosion of the structural members in the primary cooling water system including the water supply system cannot be sufficiently suppressed, and hence the amount of the radioactive substances in primary cooling water cannot be sufficiently decreased. Therefore, the does rate on the surfaces of the structural members due to the adherence of the radioactive substances thereto is increased.

On the other hand, methods of removing radioactive substances adhering to the structural members have been investigated and practiced. These methods include (1) mechanical washing, (2) electrolytic washing, and (3) chemical washing. The methods (1) and (2) encounter a difficulty in removing radioactive substances strongly adhering to the surfaces of the structural members, and are unable to decontaminate systematically over a wide area. The method (3) comprises dissolving an oxide film on the steel surface by a chemical reaction using a chemical such as an acid solution to remove radioactive substances present in the film. In this method, even if the dose rate is temporarily decreased, rapid recontamination occurs when the structural members are exposed to a liquid containing the radioactive substances dissolved therein at a high concentration again.

A method of suppressing adherence of radioactive substances by preliminarily providing an oxide film on the surfaces of structural members is disclosed in, for example, Japanese Patent Laid-Open Nos. 121197/1980 and 37498/1984. In this method, however, the adherence behavior of the radioactive substances markedly varies depending on the properties of the oxide film preliminarily provided. For example, the behavior of radioactive ions varies depending on the charged state of the oxide film. Also the rate of growth of oxide films newly formed on the surfaces of structural members after immersion in a liquid containing radioactive substances dissolved therein varies depending on the properties of the existent film. Thus a satisfactory film is not always formed.

SUMMARY OF THE INVENTION

An object of the present invention is to provide a method of reducing radioactivity in a nuclear plant having a contact with pure, high-temperature and high-pressure water containing radioactive substances.

In accordance with the present invention, there is provided a method of reducing radioactivity by preliminarily forming oxide films on the surfaces of metallic structural members to be in contact with high-temperature and high-pressure reactor water containing radioactive substances before the metallic structural members are exposed to said reactor water, characterized in that, after a first-step oxidation treatment of heating said metallic structural members in a high-temperature environment, the metallic structural members thus treated are further subjected to a second-step oxidation treatment of heating them in an environment having a higher oxidizing capacity than that of the environment in said first-step oxidation treatment to form denser oxide films that those obtained in the first step oxidation treatment.

That is, the method of suppressing adherence of radioactive substances to structural members to be in contact with reactor cooling water containing radioactive substances according to the present invention comprises formation of oxide films having a relatively high porosity but a sufficient film thickness in the first-step treatment and subsequent formation of thin but dense films in the second-step treatment.

The formation of a thick and porous film in the first-step treatment may be attained by an oxidation treatment with heated water or steam having a low oxidizing capacity, while the formation of a thin but dense film in the secondstep treatment may be attained by an oxidation treatment with heated water or steam having a higher oxidizing capacity than that in the first-step treatment.

The present invention is based on an idea that adherence of radioactive substances may be suppressed by reducing the rate of corrosion of structural members in view of the fact that the radioactive substances contained in high-temperature and high-pressure water are confined into the structural members in the course of formation of oxide films caused by corrosion of the structural members with high-temperature and high-pressure water.

The film grows thick by the first-step treatment alone in heated water having a low oxidizing capacity but is insufficient in the corrosion-suppressing effect in an environment of reactor cooling water. Therefore, the film is not sufficient in the effect of suppressing adherence of radioactive substances.

On the other hand, the second-step treaatment alone in heated water having a high oxidizing capacity provides a very thin but dense film, which is, however, subject to scratches and denaturation. Thus, in an environment of reactor cooling water, film breakage easily occurs because of the thinness of the film. Therefore the corrosion-suppressing effect and hence the effect of suppressing adherence of radioactive substances cannot be sufficiently exhibited.

It has been found that, when a thick film treated in heated water having a low oxidizing capacity is treated in heated water having a high oxidizing capacity, the resultant corrosion-suppressing effect is very remarkable.

The reason why a thick film is formed with a low oxidizing capacity may be that an iron oxide forming the oxide film is a little easily dissolved in an environment of reactor cooling water so that the film may become porous enough to promote the growth of the oxide film due to the progress of oxidation through the micropores.

On the other hand, the reason why only a thin film is formed in heated water having a high oxidizing capacity may be that an iron oxide forming the film is scarcely dissolved with the high oxidizing capacity so that the film may become dense enough to suppress the subsequent growth of the film. The dense film has a high corrosion-suppressing effect but is so liable to be broken that no sufficient effect can be obtained in an environment of reactor cooling water. Accordingly, formation of a thick and dense film provides the effects of greatly suppressing the corrosion in an environment of reactor cooling water and, hence, greatly suppressing the adherence of radioactive substances.

In view of the above, when a thick but porous film is first formed in an environment having a low oxidizing capacity and then treated in an environment having a high oxidizing capacity, micropores in an initial oxide film are filled with a dense oxide to form a dense and thick film as a whole, thus enhancing the effect of suppressing corrosion after contact with an environment of a reactor. As a result, the effect of suppressing the adherence of radioactive substances is enhanced. With an appropriate treatment, there is a possibility that as dense a film as the secondary oxide film may be formed on the primary oxide film.

The oxidizing capacity of heated water used in the first-step treatment of the two-step process must be, in principle, lower than that of reactor cooling water, while that in the second-step treatment must be higher than that of reactor cooling water.

These oxidation treatments can be effected by heated water, steam, and a heated non-oxidizing gas having a high purity. Ar, $N_2$, He, etc. can be used as such gas.

For example, cooling water for a boiling water reactor usually contains 200 ppb of dissolved oxygen. The oxidizing capacity of cooling water depends on the dissolved oxygen concentration of the cooling water. Accordingly, in short, the cooling water is preferably pure water of 200° C. or higher having a dissolved oxygen concentration of less than 200 ppb, particularly preferably 40 to 100 ppb, in the first-step treatment, and a dissolved oxygen concentration of more than 200 ppb, more preferably 300 ppb to 8 ppm, particularly preferably 300 to 1,000 ppb, in the second-step treatment. The treatment time in each step is preferably 100 to 500 hours, more preferably 100 to 200 hours.

Control of the dissolved oxygen concentration can be achieved by deaeration, introduction of oxygen, or the like. The thickness of a film in the first-step treatment is about 0.5 to 3 $\mu$m, while that of a film in the second-step treatment is about 0.05 to 0.5 $\mu$m.

In the case of treatment of austenite stainless steel, the amount of an oxide film in the first-step treatment is preferably 100 to 200 $\mu$g/cm$^2$ with a porosity of 60 to 70%, while that of an oxide film in the second-step treatment is preferably 10 to 100 $\mu$g/cm$^2$ with a porosity of 20 to 40%.

In order to reduce the oxidizing capacity in the first-step treatment, addition of a reducing substance such as hydrazine, hydrogen, or an organic chemical may be useful besides lowering of the dissolved oxygen concentration. The amount of the reducing substance that may be added is preferably 1,000 ppm or less.

In order to increase the oxidizing capacity in the second-step treatment, besides increase of the dissolved oxygen concentration, addition of an oxidizing substance such as hydrogen peroxide, a permanganate, or a chromate may be useful. The amount of the oxidizing substance that may be added is preferably 1,000 ppm or less. A denser film can be formed with a weak alkalinity, too. A pH of 8 to 10 is preferred.

These treatments may not necessarily be effected with complete separation of the first-step treatment and the second step treatment. For example, oxidation may be effected under conditions continuously variable from a low oxidizing capacity to a high oxidizing capacity. Instead of two steps, several steps of different oxidation conditions may be employed.

A theoretical background which has led to the present invention will now be described in more detail.

Radioactive substances dissolved in reactor water are confined into an oxide film formed on the surface of stainless steel due to corrosion of the stainless steel during the course of formation of the oxide film. The oxide film grows toward the inner side (side of the body metal) in the interface between the oxide film and the body metal in water of a high temperature. The radioactive substances diffuse and move through the film toward the inner side to be confined into the oxide film in the same interface. The flux ($J_0$) of the radioactive substances can be expressed by formula (1):

$$J_0 = \frac{k_0 D (C_1 - C_2)}{d} \tag{1}$$

wherein
- d: thickness of oxide film
- $k_0$: proportional constant
- D: diffusion constant
- $C_1$: concentration of radioactive substance in reactor water, and
- $C_2$: concentration of radioactive nuclide in the interfare between film and metal.

The thickness (d) of the oxide film can be expressed by the following formula:

$$d = k_1 m \tag{2}$$

wherein
- $k_1$: proportional constant, and
- m: amount of oxide film.

Thus, $J_0$ can be alternately expressed by formula (3):

$$J_0 = \frac{k_0 D(C_1 - C_2)}{k_1 m} \quad (3)$$

On the other hand, the rate ($J_1$) of confinement of radioactive substances into the film can be expressed by formula (4) using a rate ($dm/dt$) of growth of the oxide film:

$$J_1 = k_2 C_2 (dm/dt) \quad (4)$$

wherein $K_2$: proportional constant.

The rate (J) of accumulation of radioactive substances is expressed by the formula: $J = J_0 = J_1$. Thus, when $C_2$ is eliminated from the formulae (3) and (4), the following formula is obtained.

$$J = \frac{k_0 k_2 D \left(\frac{dm}{dt}\right) C_1}{k_1 k_2 m \left(\frac{dm}{dt}\right) + k_0 D} \quad (5)$$

On the other hand, when the rate of accumulation of radioactive substances is determined by the step of diffusion, the rate (J) can be expressed by formula (6):

$$J = \frac{k_0 D C_1}{k_1 m} \quad (6)$$

The formula (6) demonstrates that the rate (J) of accumulation of radioactive subtances is proportional to the diffusion constant (D) and the radioactive substance concentration ($C_1$) of reactor water, and inversely proportional to the amount of the film, namely the thickness of the film. Accordingly, formation of a dense and thick oxide film having a low diffusion constant is one measure useful for suppressing the rate of accumulation of radioactive substances. Another measure is reduction in the concentration of the radioactive substance in reactor water, namely suppression of release of ions and oxides of metals, such as, cobalt or nickel to be activated in a reactor core, and iron capable of promoting activation of these metals, into reactor water due to corrosion of structural members. The corrosion of these structural members can be suppressed by forming a dense and thick oxide film.

As described above, in order to suppress the accumulation of radioactive substances, a dense and thick oxide film has only to be preliminarily formed on structural members to be in contact with reactor water before nuclear heating begins in a nuclear plant.

For example, in the case of stainless steel used in the structural members, the rate of adherence of radioactive substances shows an interrelation with the rate of growth of the film according to the study of the present inventors. Thus, suppression of film growth is presumed to lead to reduction in adherence of them.

The reason why the rate of adherence of radioactive substances shows an interrelation with the rate of film growth may be that the radioactive substances are confined in growth points of the film. Accordingly, as the film growth is suppressed, the frequency of confinement of the radioactive substances is decreased. An increase in the amount (m) of the film on the stainless steel in an environment of cooling water is expressed by formula (7) including the logarithm of time (t):

$$m = a \log (bt + 1) \quad (7)$$

wherein a and b are constants.

Accordingly, the rate of film growth is initially high, but gets lower as the film grows further. Therefore, preliminary formation of an adequate non-radioactive oxide film particularly exerts effects of suppressing confinement of radioactive substances and dissolution of metal ions. In other words, renewed film formation after immersion in a liquid containing radioactive substances dissolved therein can be suppressed and, hence, adherence of radioactive substances frequently observed during film formation can be suppressed.

As a result of investigations on conditions of film formation with attention paid to the fact that adherence of radioactive substances can be suppressed by preliminary formation of an adequate non-radioactive oxide film on metallic structural members to be used in contact with reactor cooling water containing radioactive substances dissolved therein, and particularly to the fact that the rate of adherence of radioactive substances depends on the thickness and density of the preliminarily formed oxide film, the inventors of the present invention have found that the abovementioned rate of adherence can be remarkably reduced when an additional oxidation treatment of the film under strongly oxidizing conditions is conducted after an oxidation treatment of the film under weakly oxidizing conditions.

There are several types of nuclear plants and the method of the present invention can be applied to any of them. In a boiling water nuclear plant, a pressure vessel of a reactor, piping in a recycling system, piping in a primary coolant purification system, etc. are in contact with reactor water containing radioactive substances. In a pressurized water nuclear plant, a pressure vessel of a reactor, structural materials in the reactor, a steam generator, etc. are in contact with reactor water as described above. Therefore, when all or part of structural members made of stainless steel, Inconel, carbon steel and stellite and to be in contact with a liquid containing radioactive substances is subjected to the oxidation treatment of this invention, adherence of radioactive substances can be suppressed, leading to minimization of radiation exposure of workers.

On the other hand, in the boiling water nuclear plant, since the concentration of radioactive substances in primary cooling water in contact with structural members of water supply and steam condensation systems is comparatively low, the adherence of the radioactive substances is low and, hence, a problem of an increase in dose rate does not substantially arise. However, metallic ions or metallic oxides released due to corrosion of structural members in these systems are entrained with supply water into a pressure vessel of a reactor, thus increasing the concentration of radioactive substances in reactor cooling water. Therefore, suppression of corrosion of structural members in these systems is an important problem, too. The method of this invention is basically aiming at suppression of corrosion of structural members. Prior to start of the operation of a nuclear plant, the above-mentioned systems, namely the water supply and steam condensation systems, are subjected to the first-step treatment under weakly oxidizing conditions and the second-step treatment under strongly oxidizing conditions to form oxide films highly protective against corrosion on the surfaces of the structural members. Thus, release of metallic ions or metallic oxides into primary cooling water can be reduced. As a result, the amount of radioactive substances adhering to the recycling system and the reactor water purification system can be decreased.

porosity of about 26% was formed with a dissolved oxygen concentration of 500 ppb.

TABLE 2

| | Oxidation treatment conditions (250° C.) | | | | Environment of model reactor water (288° C.) | |
|---|---|---|---|---|---|---|
| | First-step treatment | | Second-step treatment | | Amount of ($\mu g/cm^2$) | Rate of corrosion ($\mu g/cm^2 \cdot$ month) | Rate of Co adherence ($\mu g/cm^2 \cdot$ month) |
| | Environment | Time (h) | Environment | Time (h) | | | |
| Comparative Examples | not treated | — | not treated | — | 0 | 650 | 28 |
| | DO 200 ppb | 200 | — | — | 180 | 390 | 18 |
| | DO ≦ 5 ppb | 200 | — | — | 250 | 520 | 21 |
| | DO 8 ppm | 200 | — | — | 140 | 320 | 14 |
| | DO 8 ppm | 100 | DO < 5 ppb | 100 | 180 | 340 | 18 |
| Present Invention | DO ≦ 5 ppb | 100 | DO: 8 ppm | 100 | 190 | 195 | 8 |
| | DO 100 ppb | 100 | DO: 500 ppb | 100 | 220 | 228 | 10 |
| | DO ≦ 5 ppb $N_2H_4$ 1,000 ppm | 100 | DO: 8 ppm | 100 | 240 | 195 | 7 |
| | DO ≦ 5 ppb $N_2H_4$ 1,000 ppm | 100 | DO: 8 ppm $H_2O_2$ 1,000 ppm | 100 | 200 | 130 | 6 |
| | DO ≦ 5 ppb | 100 | DO: 30 ppm | 100 | 220 | 160 | 7 |

(DO: dissolved oxygen concentration)

EMBODIMENTS OF THE INVENTION

Example 1

JIS SUS 304 stainless steel having a chemical composition (wt. %) as shown in Table 1 was subjected to various oxidation treatment with pure water of 250° C. (in a liquid state), and then immersed in heated water of 288° C. having a cobalt ion concentration of 10 ppb and a dissolved oxygen concentration of 200 ppb for 500 hours. The rate of corrosion and the amounts of Co adherence were examined with each film formed. The results are shown in Table 2.

It will be understood that the second-step treatments can suppress the rate of corrosion to as low a value as about 230 $\mu g/m^2$. month or less and the amount of Co adherence to 10 $\mu g/cm^2$. month or less.

TABLE 1

| C | Si | Mn | S | Ni | Cr | Co | P | Fe |
|---|---|---|---|---|---|---|---|---|
| 0.06 | 0.76 | 1.12 | 0.023 | 9.11 | 18.07 | 0.22 | 0.029 | balance |

Figure 1A:
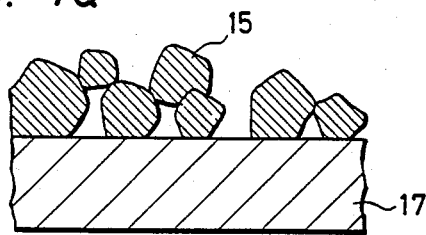
FIGS. 1a and 1b are cross-sectional views demonstrating the process of formation of an oxide film in the two-step treatments according to the present invention.
Figure 1B:
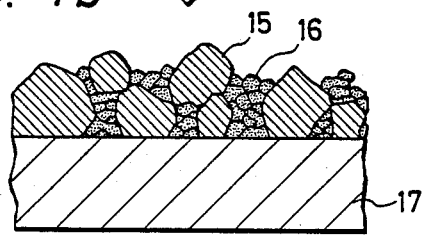

FIGS. 1a and 1b are model diagrams of growth of an oxide film according to the two-step treatments of the present invention. It is believed that a primary oxide film 15 as shown in FIG. 1a is formed on the surface of a structural member 17 made of metals according to the first-step oxidation treatment, and that a secondary oxide film 16 as shown in FIG. 16 is formed in the porous portions of the primary oxide film. As shown in FIG. 1b, the primary oxide film is densified by formation of the secondary oxide film to form a thick and dense film as a whole. Films having a porosity of about 60% were obtained with dissolved oxygen concentrations of 100 and 200 ppb in Table 2, and a film having a

Example 2

A boiling water nuclear power plant was subjected to the two-step oxidation treatments of this invention by controlling dissolved oxygen concentration of pure water of primary reactor cooling water when starting the operation and completing decontamination with use of heat generated by the operation of pumps in various systems of the plant as a heat source and without use of nuclear heating.

Figure 2:
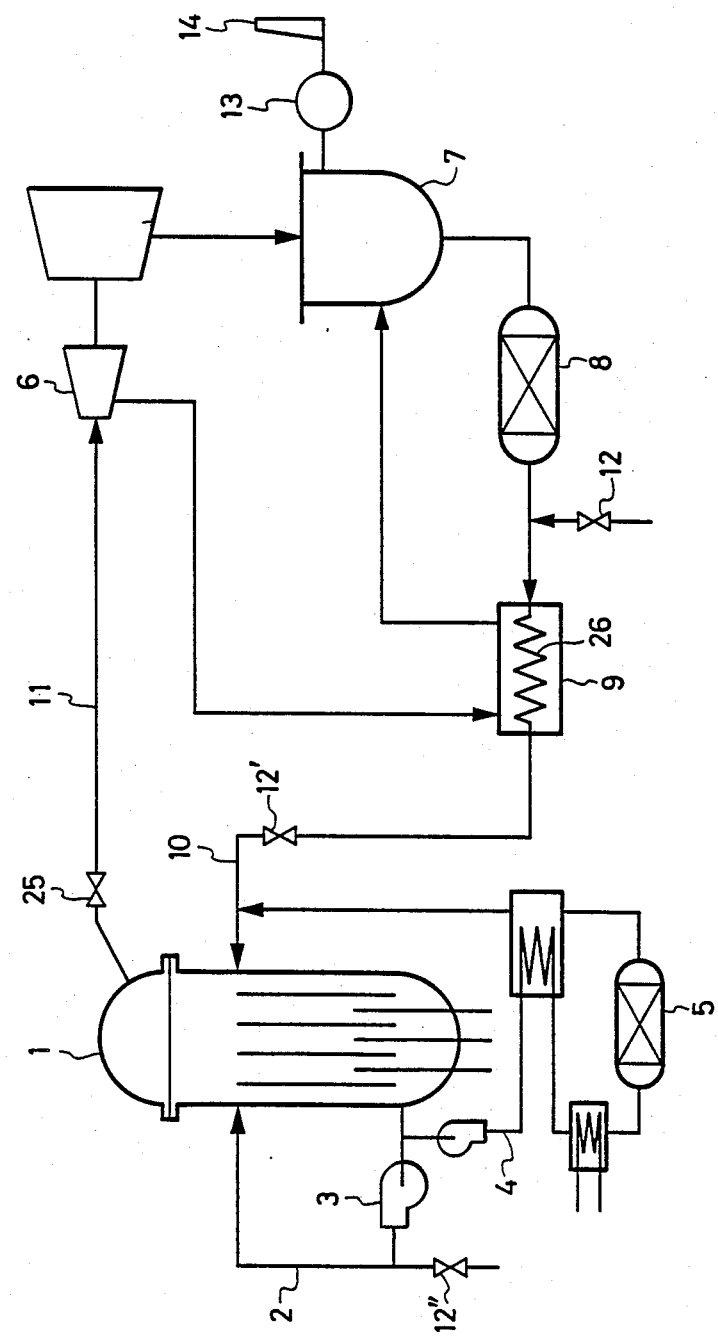
FIG. 2 is a system diagram of a boiling water nuclear power plant in one embodiment of the present invention.

FIG. 2 is a systematic view of a boiling water nuclear power plant. As can be appreciated by one of ordinary skill in the art, 6 denotes the turbine for the nuclear power plant; 7, a condenser, e.g., for reactor water after passage through the turbine; 8, a condensate purification apparatus; 9, a feed water heater, for water fed to the reactor; 12, a valve; 13, a vacuum pump; and 14, an exhaust tower. The oxidation treatments of this invention can be carried out while circulating cooling reactor water through a route of a reactor 1—a recycling system 2—a reactor water purification system 5. First, the system is filled with pure water. A main steam separation valve 25 is closed, and a recycle pump 3 is run. This elevates the water temperature in the system at a rate of 3° C./h. In the first-step treatment, heated water having a dissolved oxygen concentration of 40 to 100 ppb and a temperature of 260° to 280° C. is circulated for 100 to 500 hours. Reduction in the dissolved oxygen concentration to 40 to 100 ppb can be achieved by opening the main steam separation valve 25 to blow steam into a main steam system 11 or by passing a nitrogen gas to a gas phase in the upper portion of the reactor 1. The temperature control can be achieved by controlling the amount of heated water passing through the reactor purification system 4. After the first-step treatment is effected for a predetermined time, the dissolved oxygen concentration is raised for conducting the secondstep treatment. Heated water having a dissolved oxygen concentration of 400 to 1,000 ppb and the same temperature of 260° to 280° C. as in the first-step treatment is circulated for 100 to 500 hours. Increase in the dissolved oxygen concentration to 400 to 1,000 ppb is attained by introducing oxygen from a sampling line 12" of the recycling system. A nuclear power plant where adherence of radioactive substances is reduced can be materialized by practicing the two-step oxidation treatments as described above.

Example 3

In the same system as in Example 2, a recycle pump 3 is run to introduce hydrazine from a sampling line 12" of a recycling system in the first-step treatment. The hydrazine concentraton is thus adjusted to 100 to 1,000 ppb. Heated water having the thus adjusted concentration and a temperature of 200° to 280° C. is circulated for 100 to 500 hours. Subsequently, in the second-step treatment, hydrogen peroxide is introduced into heated water to provide a hydrogen peroxide concentration of 100 to 1,000 ppb. Heated water having the above-mentioned concentration and a temperature of 200° to 280° C. is circulated for 100 to 500 hours. The two-step oxidation treatments thus practiced can materialize a nuclear power plant where adherence of radioactive substances to the structural materials is suppressed.

Example 4

In construction of a boiling water nuclear power plant, a temporary circulation line is attached to a supply water heater 9 before the installed heater 9 is connected with the plant. The two-step treatments of this invention are carried out by circulating heated water having a dissolved oxygen concentration adjusted while using an in-plant or a temporary boiler as the heat source. Although this procedure is to suppress release of metallic ions or metallic oxides from the supply water heater 9, supply water is in contact with only the inner surface of a heater tube 26 of the supply water heater 9 as shown in FIG. 2. Accordingly, an oxidation treatment has only to be applied on the inner surface of the heater tube 26.

Figure 3:
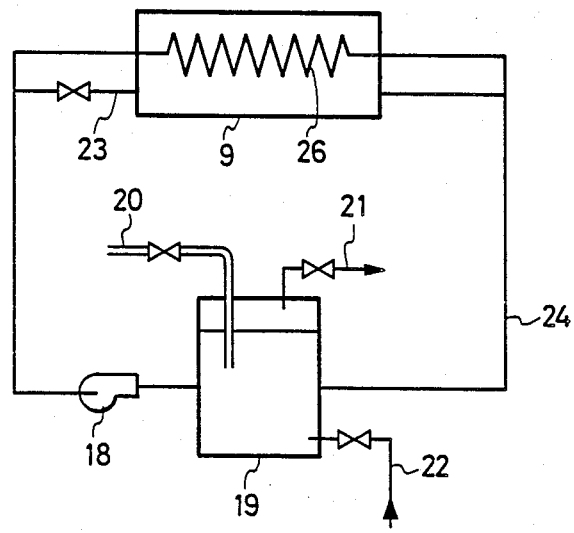
FIG. 3 is a system diagram of a temporary circulation line of a supply water heater.

A temporary circulation line 24 is attached to the inlet and outlet of the heater tube 26 in carrying out the oxidation treatment as shown in FIG. 3. The circulation line 24 is provided with a circulation pump 18, a blowing line 20 for heating steam from a boiler, a blow-off line 21 for steam, and an oxygen supply line 22. Heating steam is blown into the target system filled with pure water which is circulated. Heated water having a dissolved oxygen concentration of 40 to 100 ppb and a temperature of 200° to 250° C. is circulated for 100 to 500 hours in the first-step treatment. Adjustment of the dissolved oxygen concentration is effected by oepning the valve of the blow-off line 21 to blow off part of steam when the temperature of heated water exceeds 100° C. Subsequently, heated water having a dissolved oxygen concentration of 400 to 1,000 ppb and a temperature of 200° to 250° C. is circulated for 100 to 500 hours in the second-step treatment. Adjustment of the dissolved oxygen concentration in this treatment is effected by introducing a small amount of oxygen from the oxygen supply line 22. Although the above-mentioned two-step oxidation treatments have only to be effected on only the inner surface of the heater tube 26, circulation of heated water only through the inside of the heater tube 26 provides a remarkably large pressure difference between the inside and outside of the tube, leading to inconvenience such as deformation of the tube. Therefore, part of circulation water must be bypassed out of the tube to reduce the pressure difference. Thus, bypass line 23, for bypassing part of the circulation out of the tube, is provided.

By the two-step oxidation treatments as described above, release of metallic ions or metallic oxides due to corrosion of the heater tube of the supply water heater can be reduced to decrease the radioactivity of reactor water. Thus a nuclear power plant where adherence of radioactive substances is suppressed can be materialized.

Example 5

The two-step oxidation treatments according to the present invention are effected by passing steam having an oxygen concentration adjusted therein and originated from steam coming out of the in-plant boiler through the same supply water heater as in Example 4. Since it is difficult to decrease the content of oxygen in the steam coming out of the in-plant boiler, the steam is passed as such through the heater tube of the supply water heater in the first-step treatment. The steam of a temperature of about 200° C. is passed for 100 to 500 hours. Subsequently, in the second-step treatment, steam having an oxygen concentration of 100 to 1,000 ppm adjusted by introducing an oxygen gas thereinto is passed for 500 to 1,000 hours. By these treatments, release of metallic ions or metallic oxides due to corrosion of the heater tube of the supply water heater can be reduced to decrease the radioactivity of reactor water. Thus a nuclear power plant where adherence of radioactive substances is suppressed can be materialized.

Example 6

The oxidation treatments according to the present invention were conducted by using a steel pipe having the same specifications as those of SUS 304 stainless steel used in Example 1 outside the system of a nuclear power plant.

In a vessel, a first-step oxidation treatment was carried out in pure water having a dissolved oxygen concentration of 100 ppb and a temperature of 250° C. for 100 hours. Subsequently, an oxidation treatment was carried out in pure water having a dissolved oxygen concentration of 400 ppb and a temperature of 250° C. for 100 hours. The corrosion test and the measurement of amount of Co adherence were made in the same manner as in Example 1. The rate of corrosion of the treated pipe was 200 $\mu g/cm^2$. month. The rate of Co adherence was 9 $\mu g/cm^2$. month. Thus excellent effects of suppressing corrosion and Co adherence were recognized. A steel pipe as prepared in the above-mentioned manner can be used by connecting the same with a predetermined portion of a nuclear power plant by welding.

Where oxidation treatments cannot be effected in a vessel, the oxidation treatments on only the inner surface of the steel pipe can be effected in an apparatus provided with a circulation line and a heating means as shown in FIG. 3 in the same manner as described above. In this case, the treatments are so effected as to keep the temperature of the steel pipe to be subjected to the oxidation treatments. The steel pipe thus treated is detached, and can be connected with a predetermined portion of a nuclear power plant by welding as described above to be placed in service.

What is claimed is:

1. A method of reducing radioactivity in a nuclear plant by preliminarily forming oxide films on the surfaces of metallic structural members to be in contact with high-temperature and high-pressure reactor water containing radioactive substances before said metallic structural members are exposed to said reactor water, comprising the steps of:

subjecting said structural members to a first-step oxidation treatment of heating said structural members in water of a temperature of at least 200° C., and further subjecting the thus treated structural members to a second-step oxidation treatment of heating said treated structural members in water, of a temperature of at least 200° C., having a higher oxidizing capacity than that of said water in said first-step oxidation treatment, such that in the first-step oxidation treatment a relatively thick and porous oxide film, as compared to the oxide film formed in the second-step oxidation treatment, is formed, and in the second-step oxidation treatment a relatively denser and thinner oxide film than the oxide film obtained in said first-step oxidation treatment is formed, so that adherence of radioactive substances to said metallic structural members is suppresed as compared to adherence of radioactive substances to metallic structural members not having been subjected to both the first and second-step oxidation treatments.

2. A method of reducing radioactivity in a nuclear plant as claimed in claim 1, wherein said firststep oxidation treatment is conducted with pure water of a temperature of at least 200° C., having a dissolved oxygen concentration of lower than 200 ppb.

3. A method of reducing radioactivity in a nuclear plant as claimed in claim 2, wherein said pure water in said first-step oxidation treatment has a dissolved oxygen concentration of 40 to 100 ppb.

4. A method of reducing radioactivity in a nuclear plant as claimed in claim 1, wherein said water in said first-step oxidation treatment is pure water of a temperature of at least 200° C., containing one or more members selected from the group consisting of hydrazine and salts of organic acids.

5. A method of reducing radioactivity in a nuclear plant as claimed in claim 1, wherein said second-step oxidation treatment is conducted with pure water of a temperature of at least 200° C., having a dissolved oxygen concentration of higher than 200 ppb.

6. A method of reducing radioactivity in a nuclear plant as claimed in claim 5, wherein said pure water in said second-step oxidation treatment has a dissolved oxygen concentration of 300 to 1,000 ppb.

7. A method of reducing radioactivity in a nuclear plant as claimed in claim 4, wherein said second-step oxidation treatment is conducted with pure water of a temperature of at least 200° C. containing one or more members selected from the group consisting of hydrogen peroxide, chromates, and permanganates.

8. A method of reducing radioactivity in a nuclear plant as claimed in claim 7, wherein said pure water is weakly alkaline with a pH of 8 to 10.

9. A method of reducing radioactivity in a nuclear plant as claimed in claim 1, wherein said metallic structural members are made of steel.

10. A method of reducing radioactivity in a nuclear plant as claimed in claim 9, wherein said structural members are subjected to said first-step oxidation treatment so as to form an iron oxide film, and are subjected to said second-step oxidation treatment so as to form an iron oxide film denser and thinner than the iron oxide film formed in the first-step oxidation treatment.

11. A method of reducing radioactivity in a nuclear plant as claimed in claim 9, wherein the steel structural members are made of steel selected from the group consisting of carbon steel and stainless steel.

12. A method of reducing radioactivity in a nuclear plant as claimed in claim 11, wherein said structural members are subjected to said first-step oxidation treatment so as to form an iron oxide film, and are subjected to said second-step oxidation treatment so as to form an iron oxide film denser and thinner than the iron oxide film formed in the first-step oxidation treatment.

13. A method of reducing radioactivity in a nuclear plant as claimed in claim 1, wherein said reactor water has an oxidizing capacity, wherein the environment of a temperature of at least 200° C. to which the structural members are subjected during the first-step oxidation treatment is water having a lower oxidizing capacity than that of said reactor water, and wherein the environment of the second-step oxidation treatment is water having a higher oxidizing capacity than that of said reactor water.

14. A method of reducing radioactivity in a nuclear plant as claimed in claim 1, wherein the thickness of the oxide film formed in the first-step oxidation treatment is 0.5 to 3 $\mu$m, and the thickness of the denser oxide film formed in the second-step oxidation treatment is 0.05 to 0.5 $\mu$m.

15. A method of reducing radioactivity in a nuclear plant as claimed in claim 2, wherein said second-step oxidation treatment is conducted with pure water of a temperature of at least 200° C., having a dissolved oxygen concentration of higher than 200 ppb.

16. A method of reducing radioactivity in a nuclear plant by forming oxide films on the surfaces of metallic structural members which constitute a nuclear power plant which generates electric power by rotating a generator with a turbine driven by steam generated in a reactor, the oxide films being formed by circulating pure water of a temperature of at least 200° C. from a pressure vessel of the reactor through a recycling system and partially through a reactor water purification system to said pressure vessel before said structural members are exposed to reactor water containing radioactive substances, said reactor water having an oxidizing capacity, comprising the steps of:

controlling the oxidizing capacity of pure water to be lower than that of said reactor water, subjecting said structural members to a first-step oxidation treatment of heating by circulation of pure water of a temperature of at least 200° C., the pure water being the pure water having the oxidizing capacity controlled to be lower than that of the reactor water, further controlling the controlled pure water to have a higher oxidizing capacity than that of said reactor water, and further subjecting the thus treated structural members to a second-step oxidation treatment of heating by circulation of the further controlled pure water, of a temperature of at least 200° C., further controlled to have the higher oxidizing capacity than that of said reactor water, such that in the first-step oxidation treatment a relatively thick and porous oxide film, as compared to the oxide film formed in the second-step oxidation treatment, is formed, and in the second-step oxidation treatment a relatively denser and thinner oxide film than the oxide film obtained in said first-step oxidation treatment is formed.

17. A method of reducing radioactivity in a nuclear plant as claimed in claim 16, wherein said metallic structural members are made of steel.

18. A method of reducing radioactivity in a nuclear plant as claimed in claim 17, wherein the steel structural members are made of steel selected from the group consisting of carbon steel and stainless steel.

19. A method of reducing radioactivity in a nuclear plant comprising the steps of:

subjecting feed water heater tubes to a first-step oxidation treatment of heating by circulating pure water of a temperature, of at least 200° C., having a lower oxidizing capacity than that of reactor water passed through the heater tubes during operation of the nuclear plant for nuclear heating, and further subjecting the thus treated heater tubes to a second-step oxidation treatment of heating by circulating pure water of a temperature, of at least 200° having a higher oxidizing capacity than that of said reactor water, such that in the first-step oxidation treatment a relatively thick and porous oxide film, as compared to the oxide film formed in the second-step oxidation treatment, is formed, and in the second-step oxidation treatment a relatively denser and thinner oxide film than the oxide film obtained in said first-step oxidation treatment is formed, said first- and second-step oxidation treatments being conducted before start of the nuclear heating in the nuclear plant which generates electric power by rotating a generator with a turbine driven by steam generated in a reactor.

20. A method of reducing radioactivity in a nuclear plant as claimed in claim 19, wherein said feed water heater tubes are made of steel.

21. A method of reducing radioactivity in a nuclear plant as claimed in claim 20, wherein the steel feed water heater tubes are made of steel selected from the group consisting of carbon steel and stainless steel.

22. A method of reducing radioactivity in a nuclear plant by forming oxide films on the surfaces of structural members made of steel to be in contact with high-temperature and high-pressure reactor water, comprising the steps of:

preparing reactor water, to be used in the nuclear plant, the reactor water being substantially free from radioactive substances;

effecting a first control of the dissolved oxygen concentration of said reactor water so as to be less in its oxidizing capacity than that of the reactor water used in the nuclear plant;

subjecting said structural members to a first-step oxidation treatment of heating said structural members in contact with said reactor water controlled in said first control of the dissolved oxygen concentration at 200° C. or higher for a predetermined period of time, thereby to provide thick and porous oxide films on the surfaces of the structural members;

effecting a second control of the dissolved oxygen concentration of said reactor water so as to be higher in the oxidizing capacity than that of the reactor water used in the nuclear plant;

further subjecting said structural members treated in said first-step oxidation treatment to a second-step oxidation treatment of heating said treated structural members in contact with said reactor water controlled in said second control of the dissolved oxygen concentration at 200° C. or higher for a predetermined period of time, thereby to make said oxide films into thick and dense oxide films; and then operating the nuclear plant to produce electric power.

23. A method of reducing radioactivity in a nuclear plant as claimed in claim 22, wherein, in the first and second control steps, the dissolved oxygen concentrations are controlled to be 50 to 100 ppb and 300 to 1,000 ppb, respectively.

24. A method of reducing radioactivity in a nuclear plant as claimed in claim 23, wherein said first- and second-step oxidation treatments each are conducted for 100 to 500 hours.

25. A method of reducing radioactivity in a nuclear plant as claimed in claim 22, wherein the steel structural members are made of steel selected from the group consisting of carbon steel and stainless steel.

* * * * *